United States Patent
Matsuo

(10) Patent No.: US 9,900,637 B2
(45) Date of Patent: Feb. 20, 2018

(54) WIRELESS COMMUNICATION SYSTEM, TRANSMISSION DEVICE, RECEPTION DEVICE, AND COMMUNICATION TERMINAL

(71) Applicant: MITSUBISHI ELECTRIC CORPORATION, Tokyo (JP)

(72) Inventor: Eiji Matsuo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/037,866

(22) PCT Filed: May 13, 2014

(86) PCT No.: PCT/JP2014/062684
§ 371 (c)(1),
(2) Date: May 19, 2016

(87) PCT Pub. No.: WO2015/075956
PCT Pub. Date: May 28, 2015

(65) Prior Publication Data
US 2016/0295258 A1    Oct. 6, 2016

(30) Foreign Application Priority Data

Nov. 20, 2013 (JP) ................................ 2013-240076

(51) Int. Cl.
*H04N 7/16* (2011.01)
*H04N 21/242* (2011.01)
(Continued)

(52) U.S. Cl.
CPC ........... *H04N 21/242* (2013.01); *H04L 43/16* (2013.01); *H04N 21/4305* (2013.01);
(Continued)

(58) Field of Classification Search
None
See application file for complete search history.

(56) References Cited

U.S. PATENT DOCUMENTS 6,491,739 B1  12/2002  Crome et al.
8,514,335 B2   8/2013  Murakami et al.
(Continued)

FOREIGN PATENT DOCUMENTS

| | | |
|---|---|---|
| JP | 4-364621 A | 12/1992 |
| JP | 5-219031 A | 8/1993 |
| JP | 2004-140691 A | 5/2004 |
| JP | 2008-533808 A | 8/2008 |
| JP | 2008-538691 A | 10/2008 |
| JP | 2010-500801 A | 1/2010 |
| JP | 2010-268484 A | 11/2010 |
| JP | 2010-272900 A | 12/2010 |
| JP | 2010-278974 A | 12/2010 |
| JP | 2010-539850 A | 12/2010 |
| JP | 4605892 B2 | 1/2011 |
| JP | 2011-130126 A | 6/2011 |

(Continued)

OTHER PUBLICATIONS

"Musen LAN Spot ni Okeru Riyosha Tanmatsu no Riyo Sokushin Gijutsu o Kaihatsu; Besshi 2(3) Seamless Handover Gijutsu." Mobile System Kyogikai, Aug. 24, 2004, pp. 7-8.

*Primary Examiner* — Kunal Langhnoja
(74) *Attorney, Agent, or Firm* — Birch, Stewart, Kolasch & Birch, LLP

(57) ABSTRACT

When the communication method is switched, a reception device synchronizes an I picture of video data transmitted by a communication method before the switching and video data transmitted by a communication method after the switching with each other, and then performs the switching immediately before an I picture. A transmission device generates synchronization data, and a reception device performs synchronization with reference to the synchronization data. Video can be prevented from becoming discontinuous, when the communication method is switched.

8 Claims, 9 Drawing Sheets

(51) Int. Cl.
  *H04N 21/63* (2011.01)
  *H04N 21/4363* (2011.01)
  *H04L 12/26* (2006.01)
  *H04W 36/30* (2009.01)
  *H04N 21/43* (2011.01)
  *H04N 21/44* (2011.01)
  *H04W 88/06* (2009.01)
  *H04W 36/14* (2009.01)
  *H04W 36/18* (2009.01)

(52) U.S. Cl.
  CPC ... *H04N 21/4363* (2013.01); *H04N 21/44016* (2013.01); *H04N 21/631* (2013.01); *H04W 36/30* (2013.01); *H04W 36/14* (2013.01); *H04W 36/18* (2013.01); *H04W 88/06* (2013.01)

(56) References Cited

U.S. PATENT DOCUMENTS

| | | |
|---|---|---|
| 2006/0240828 A1 | 10/2006 | Jain et al. |
| 2008/0039057 A1 | 2/2008 | Worrall et al. |
| 2009/0222873 A1 | 9/2009 | Einarsson |
| 2010/0215021 A1 | 8/2010 | Li et al. |
| 2011/0249181 A1 | 10/2011 | Iwami et al. |
| 2012/0311173 A1 | 12/2012 | Agarwal et al. |

FOREIGN PATENT DOCUMENTS

| | | |
|---|---|---|
| JP | 2011-223360 A | 11/2011 |
| JP | 2013-150339 A | 8/2013 |
| JP | 2013-153312 A | 8/2013 |
| JP | 2013-207355 A | 10/2013 |
| WO | WO 2008/123509 A1 | 10/2008 |

FIG. 4A  Dva  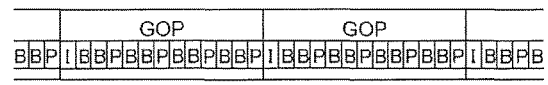
FIG. 4B  Dvb  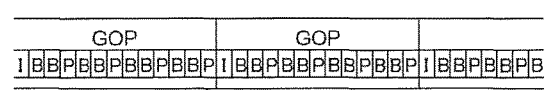
FIG. 4C  Dva  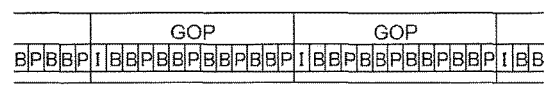
FIG. 4D  Dvb  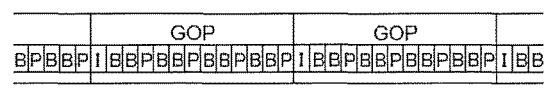

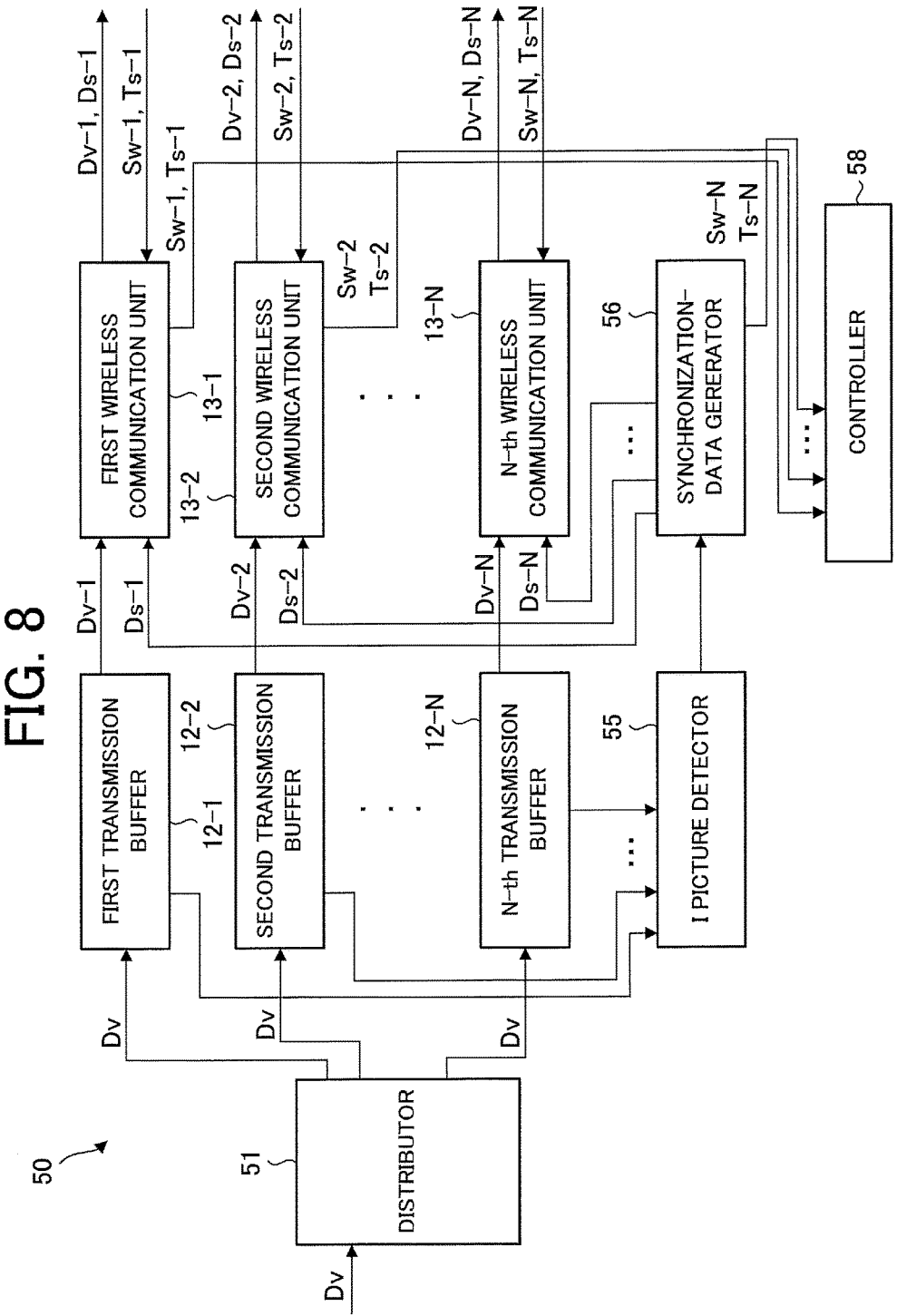

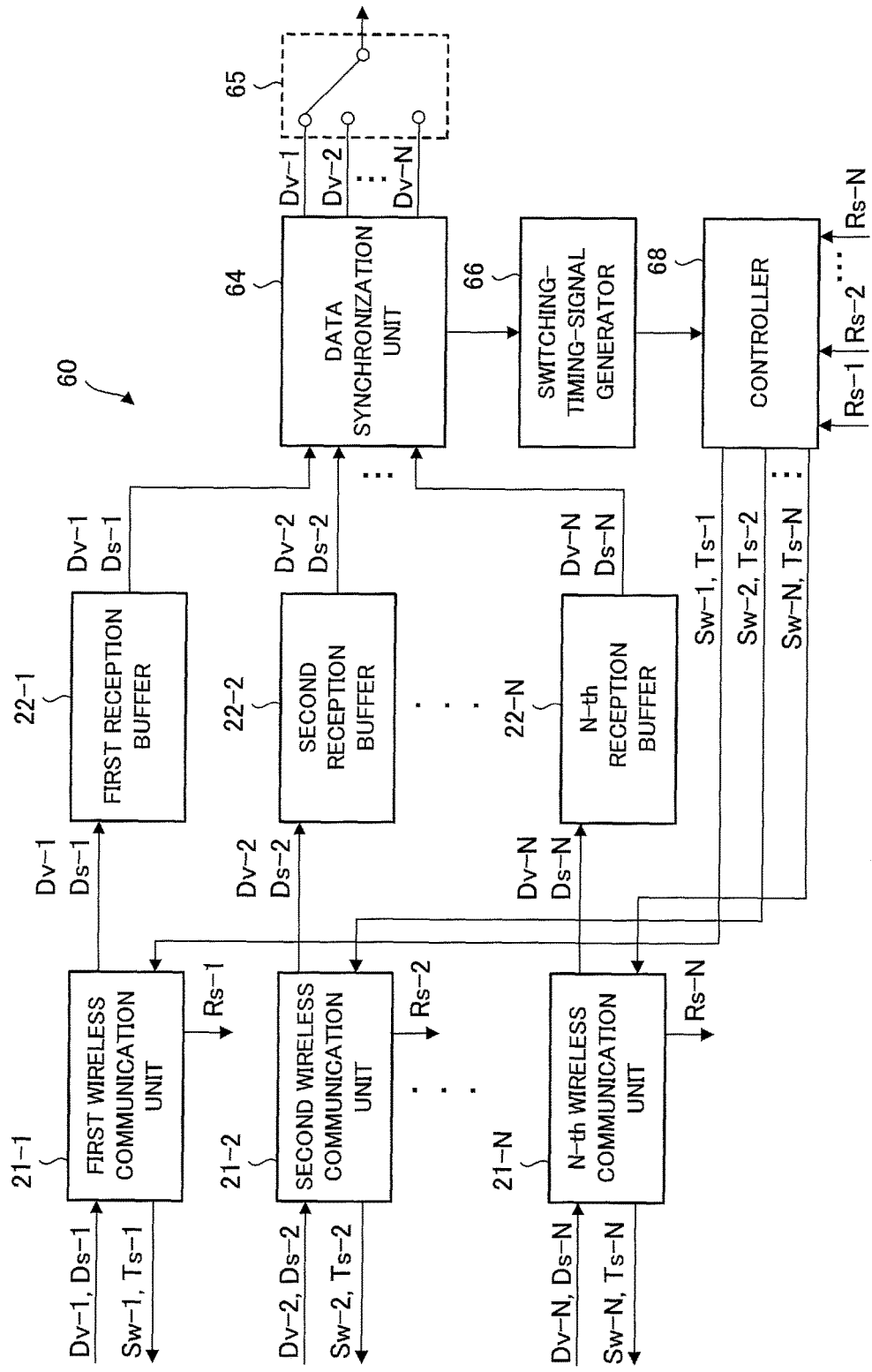

WIRELESS COMMUNICATION SYSTEM, TRANSMISSION DEVICE, RECEPTION DEVICE, AND COMMUNICATION TERMINAL

TECHNICAL FIELD

The present invention relates to a wireless communication system capable of communicating by a plurality of communication methods (multi-mode communication). In addition, the present invention relates to a transmission device and a reception device for configuring a wireless communication system. Further, the present invention relates to a communication terminal including a transmission device and a reception device.

BACKGROUND ART

There is a conventional wireless communication method that can multi-mode communication by using one or both of first and second channels (for example, patent reference 1).

CITATION LIST

Patent Literature

PATENT REFERENCE 1: Japanese Patent No. 4608592 (FIG. 16)

SUMMARY OF INVENTION

Technical Problem

The conventional wireless communication has a problem that video becomes discontinuous and disturbance occurs since discontinuity of data occurs when a communication method is switched.

Solution to Problem

The present invention has an object to solve the above problem. A wireless communication system according to one aspect of the invention includes a transmission device configured to wirelessly transmit video data by a communication method selected from a plurality of communication methods and a reception device configured to receive and decode the video data transmitted by the transmission device. When receiving condition in the reception device becomes worse than a predetermined level in a state where the transmission device performs transmission by one communication method of the plurality of communication methods, the reception device requests switching to another communication method than the one communication method of the plurality of the communication method. The transmission device continues the transmission by the one communication method and starts transmission by the another communication method, in response to the request of the switching. The reception device synchronizes the video data transmitted by the one communication method and the video data transmitted by the another communication method, and then performs switching from the video data transmitted by the one communication method to the video data transmitted by the another communication method. After the switching, the reception device requests a stop of the transmission by the one communication method. The transmission device stops the transmission by the one communication method in response to the request of stop of the transmission. The transmission device includes a distributor configured to distribute the video data, a plurality of transmission buffers, a plurality of wireless transmission units, a detector configured to detect an I picture of video included in the video data accumulated in the plurality of transmission buffers, a synchronization-data generator configured to generate synchronization data, and a controller configured to control the plurality of wireless transmission units. In order to perform transmission by the plurality of communication methods, the distributor distributes the video data transmitted by the plurality of communication methods to plurality of the transmission buffer, the detector configured to detect the I picture detects the I picture of video included in the video data accumulated in the plurality of transmission buffer, the synchronization-data generator outputs the synchronization data indicating reproduction time of I picture of video detected by the detector configured to detect the I picture of the video, and the n-th wireless communication unit transmits the synchronization data together with the video data. The reception device includes a plurality of wireless reception units configured to receive the video data transmitted by the plurality of communication methods respectively and outputs information indicating receiving condition a plurality of reception buffers configured to temporarily accumulate the video data received by the plurality of wireless reception unit, respectively, and a controller configured to generate a signal for requesting switching to the another communication method when the receiving condition in one wireless reception unit of the plurality of wireless reception units becomes worse than a predetermined level in the state where transmission is performed by the one communication method of the plurality of communication methods. At least any one of the plurality of wireless reception units transmits the signal for requesting switching of the communication method to the transmission device. After receiving the signal for requesting the switching of the communication method from the reception device in the state where transmission of video data is performed by the one communication method of the plurality of communication methods, the distributor starts distributing video data to one transmission buffer of the plurality of transmission buffer by the another communication method, so that transmission of video data by the plurality of wireless transmission units are performed in parallel. The reception device further includes a data synchronization unit configured to read and synchronize the video data accumulated in the plurality of reception buffer while the video data is transmitted by the plurality of communication method, a switching-timing-signal generator configured to generate a switching-timing signal when time points of reading of the I pictures included in the video data from the plurality of reception buffer are coincident by synchronizing in the data synchronization unit, and a switch configured to switch from the video data transmitted by the one communication method of the plurality of the communication methods to the video data transmitted by the another communication method when the switching-timing signal is generated. The controller generates a signal for requesting the stop of the transmission of the video data by the one communication method when the switching-timing signal is generated. At least any one of the plurality of wireless reception units transmit the signal for requesting the stop of the transmission to the transmission device. After receiving the signal for requesting the stop of the transmission by the one communication method of the plurality of communication method from the reception device, the distributor stops distributing the video data to the transmission buffer except the one transmission buffer of the plurality of transmission buffers.

A transmission device for wirelessly transmitting video data by a communication method selected from first to N-th (N being an integer equal to or greater than 2) communication methods according to one aspect of the invention includes a distributor configured to distribute the video data, first to N-th transmission buffers configured to temporarily accumulate the video data distributed by the distributor, first to N-th wireless transmission units configured to transmit the video data accumulated in the first to N-th transmission buffers by the first to N-th communication methods, respectively, an I picture detector configured to detect an I picture included in the video data accumulated in the first to N-th transmission buffers, a synchronization-data generator configured to generate synchronization data indicating reproduction time of the I picture detected by the I picture detector, and a controller configured to control the distributor and the first to N-th wireless transmission units. When transmission is performed by an n-th communication method of the first to N-th communication methods, where n is one of 1 to N, the distributor distributes the video data to the n-th transmission buffer of the first to N-th transmission buffers, and the I picture detector detects the I picture included in the video data accumulated in the n-th transmission buffer, and the synchronization-data generator outputs the synchronization data indicating the reproduction time of the I picture detected by the I picture detector, and the n-th wireless transmission unit of the first to N-th transmission units transmits the synchronization data together with the video data. After receiving a signal for requesting switching of the communication method in a state where transmission of video data is performed by an i-th communication method of the first to N-th communication methods, where i is one of 1 to N, the distributor starts distribution of video data to a j-th transmission buffer of the first to N-th transmission buffers, where j is one of 1 to N except i, so that transmission of video data by the i-th wireless transmission unit of the first to N-th transmission units and transmission of video data by the j-th wireless transmission unit of the first to N-th transmission units are performed in parallel. After receiving a signal for requesting a stop of the transmission by the i-th communication method, the distributor stops distributing video data to the i-th transmission buffer of the first to N-th transmission buffers.

A reception device for receiving video data that is wirelessly transmitted by first to N-th (N being an integer equal to or greater than 2) communication methods according to one aspect of the invention includes first to N-th wireless reception units configured to receive the video data transmitted by the first to N-th communication methods respectively and output information indicating receiving condition, first to N-th reception buffers configured to temporarily accumulate the video data received by the first to N-th wireless reception units, respectively, a controller configured to generate a signal for requesting switching to a j-th communication method of the first to N-th communication methods, j being one of 1 to N except i, when the receiving condition in an i-th wireless reception unit of the first to N-th wireless reception units becomes worse than a predetermined level in the state where transmission is performed by the i-th communication method of the first to N-th communication methods, where i is one of 1 to N, a data synchronization unit configured to read and synchronize the video data accumulated in the i-th reception buffer of the first to N-th reception buffers and the j-th reception buffer of the first to N-th reception buffers while the video data are transmitted by both of the i-th communication method and the j-th communication method of the first to N-th communication methods, a switching-timing-signal generator configured to generate a switching-timing signal when a time point of reading of the I picture included in the video data from the i-th reception buffer and a time point of reading of the I picture included in the video data from the j-th reception buffer are coincident by synchronizing in the data synchronization unit, and a switch configured to switch from the video data transmitted by the i-th communication method to the video data transmitted by the j-th communication method when the switching-timing signal is generated. The controller generates a signal for requesting a stop of the transmission of the video data by the first communication method when the switching-timing signal is generated. At least one of the i-th wireless reception unit of the first to N-th wireless reception units and the j-th wireless reception unit of the first to N-th wireless reception units transmits the signal for requesting the switching of the communication method and the signal for requesting the stop of the transmission.

Advantageous Effects of Invention

According to the present invention, when the communication method is switched, the reception device synchronizes an I picture of video data transmitted by a communication method before the switching and video data transmitted by a communication method after the switching with each other, and then performs the switching immediately before an I picture, and therefore, it is possible to prevent occurring of discontinuity of video data to be reproduced, and it is possible to prevent occurring of disturbance of video to be displayed.

BRIEF DESCRIPTION OF DRAWINGS

FIGS. 4A to 4D are time charts illustrating a synchronization process by a data synchronization unit in the reception device according to the first embodiment.

FIG. 8 is a block diagram illustrating a configuration example of a transmission device used in a wireless communication system of a fourth embodiment of the present invention.

FIG. 9 is a block diagram illustrating a configuration example of a reception device used in the wireless communication system of the fourth embodiment.

DESCRIPTION OF EMBODIMENTS

First Embodiment

Figure 1:
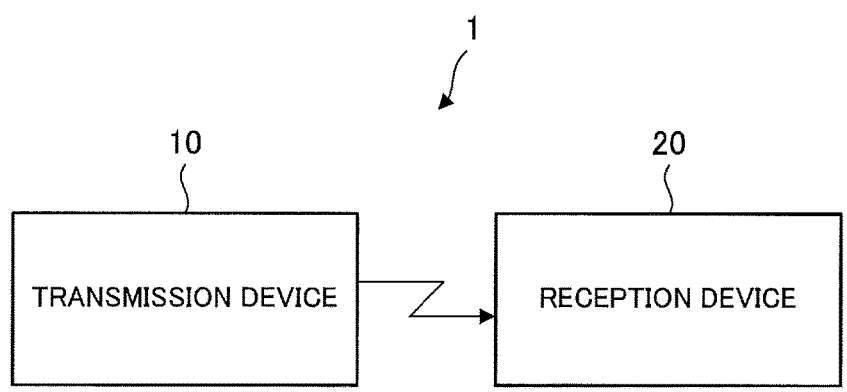
FIG. 1 is a configuration diagram illustrating a wireless communication system of a first embodiment of the present invention.

FIG. 1 illustrates a wireless communication system 1 of the first embodiment of the present invention.

The illustrated wireless communication system is a system (a multi-mode communication system) including a transmission device 10 and a reception device 20 to transmit video data wirelessly from the transmission device 10 to the reception device 20, and is capable of selecting one of a plurality of communication methods.

Figure 2:
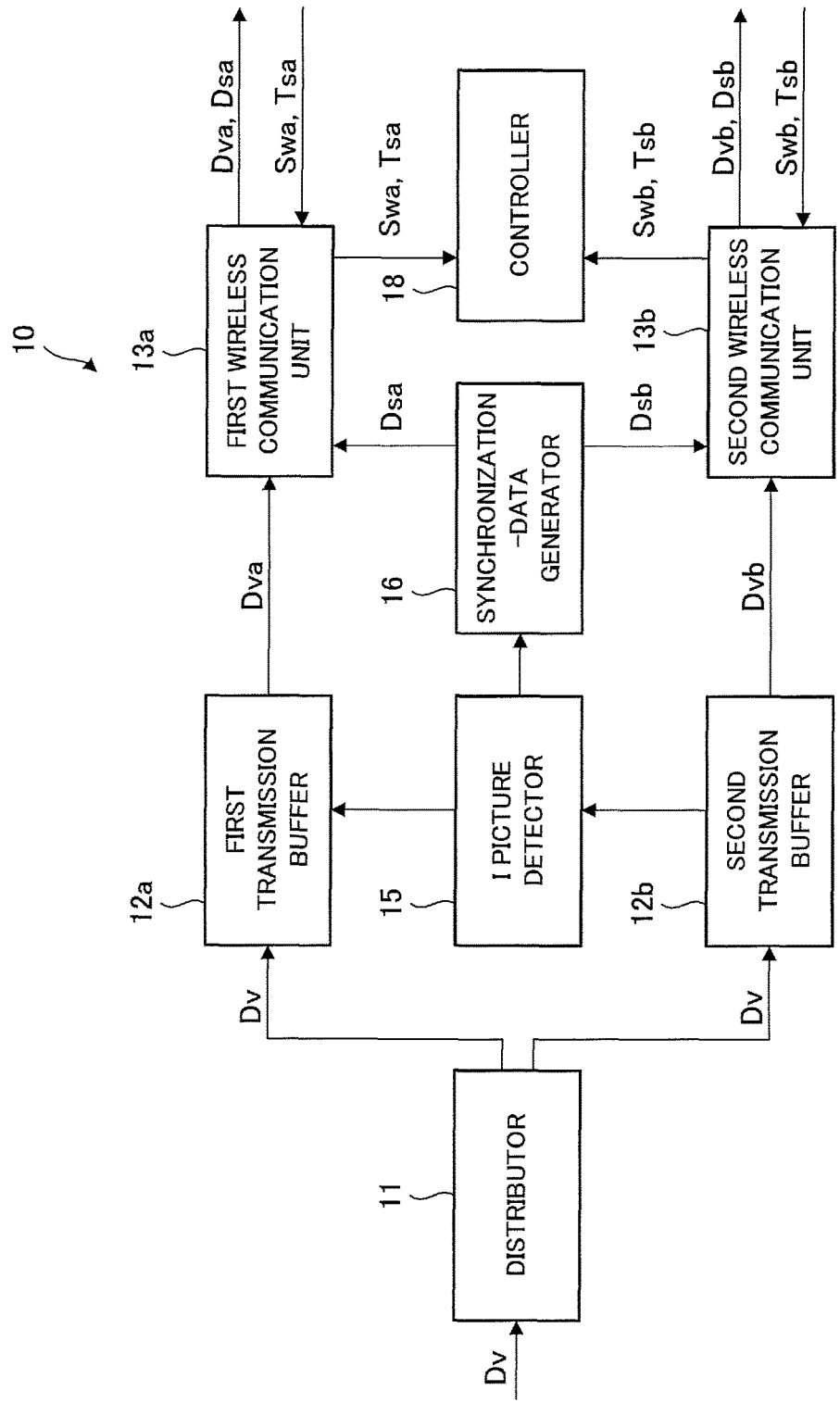
FIG. 2 is a block diagram illustrating a configuration example of a transmission device used in the wireless communication system of the first embodiment.
Figure 3:
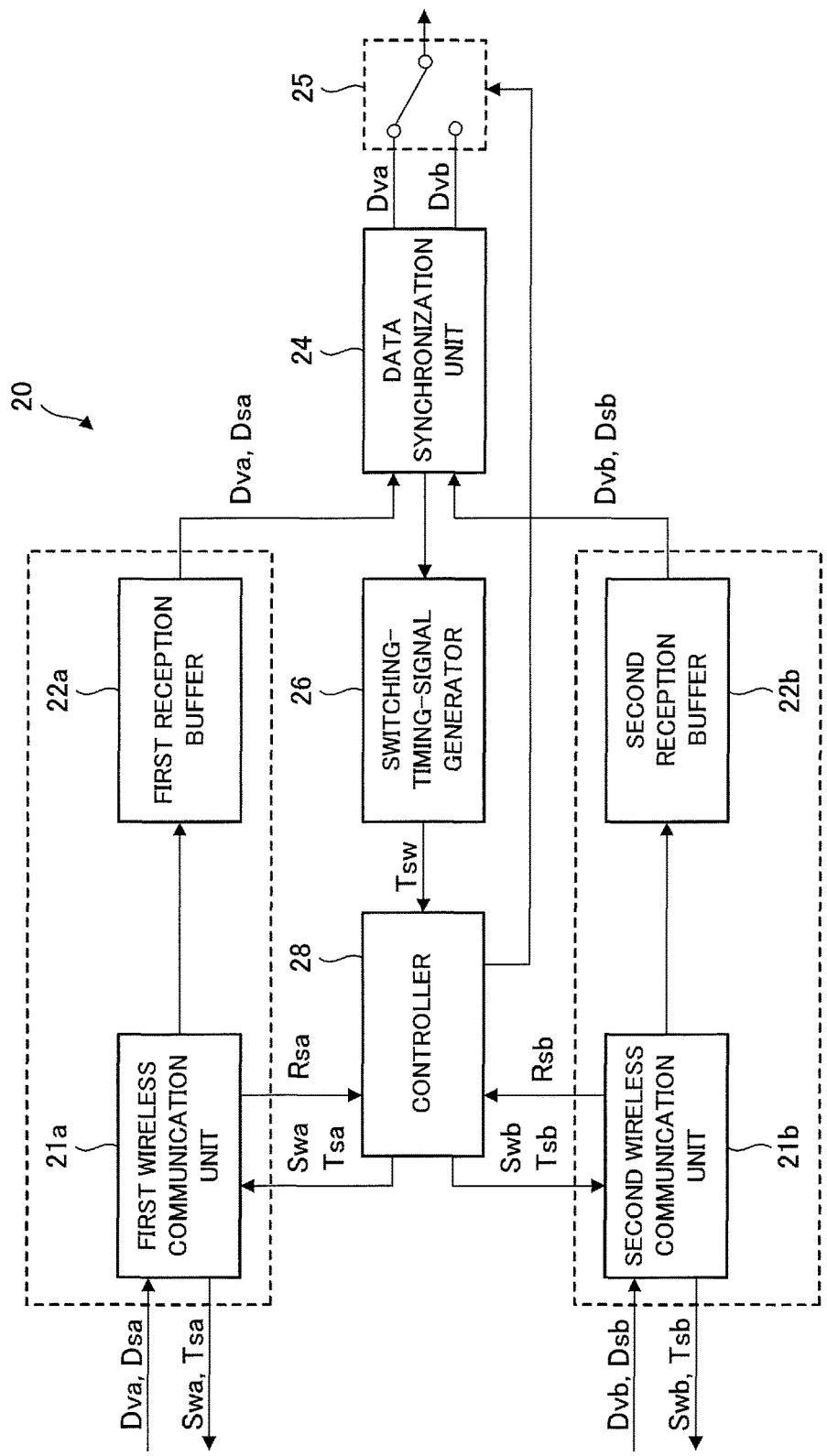
FIG. 3 is a block diagram illustrating a configuration example of a reception device used in the wireless communication system of the first embodiment.

FIGS. 2 and 3 illustrate configuration examples of the transmission device 10 and the reception device 20 of FIG. 1, respectively.

The transmission device 10 illustrated in FIG. 2 can select one of first and second communication methods and perform transmission by the selected communication method. For example, the first communication method is Bluetooth (registered trademark) method, and the second communication method is Wi-Fi method.

Although the transmission device 10 normally selects one of the first and second communication methods and performs transmission by the selected communication method, the transmission device 10 performs transmission in parallel by both of the first and second communication methods when the communication method is switched.

The illustrated transmission device 10 includes a distributor 11, first and second transmission buffers 12a, 12b, first and second wireless communication units 13a, 13b, an I picture detector 15, a synchronization-data generator 16, and a controller 18.

The distributor 11 distributes video data Dv supplied from outside and supplies it to the first and second transmission buffers 12a and 12b.

The video data Dv forms, for example, video content and is, for example, MPEG format data, and is transmitted by Group Of Pictures (GOP) as a unit. In each GOP, an I picture is located at the head, and a plurality of P pictures and a plurality of B pictures are included.

Each of the first and second transmission buffers 12a and 12b temporarily accumulates the video data Dv supplied from the distributor 11. Reference signs Dva, Dvb represent the video data accumulated in the buffers 12a, 12b, respectively.

The first wireless communication unit 13a reads the video data Dva accumulated in the first transmission buffer 12a, and wirelessly transmits it to the reception device 20 by the first communication method.

The second wireless communication unit 13b reads the video data Dvb accumulated in the second transmission buffer 12b, and wirelessly transmits it to the reception device 20 by the second communication method.

Normally, only one of a combination of the first transmission buffer 12a and the first wireless communication unit 13a and a combination of the second transmission buffer 12b and the second wireless communication unit 13b operates, and the other stops its operation. When the communication method is switched, both of the above two combinations temporarily operate at the same time.

The wirelessly transmitted video data Dva, Dvb are received by the reception device 20 of FIGS. 1, 3.

Further, the first and second wireless communication units 13a, 13b receive switching-request signals Swa, Swb and transmission-stop signals Tsa, Tsb from the reception device 20 of FIGS. 1, 3, and transmit them to the controller 18.

The switching-request signals Swa, Swb are sent out from the reception device 20 when the receiving condition with a currently selected communication method becomes worse, and request switching to a communication method that is different from the currently selected communication method.

When the switching of the communication method is completed in the reception device 20, the transmission-stop signals Tsa, Tsb notify that fact and request a stop of transmission by the communication method (the communication method before the switching) that has been selected so far.

The I picture detector 15 detects I pictures in the video data Dva, Dvb accumulated in the first and second transmission buffers 12a, 12b, and transmits a detection result to the synchronization-data generator 16. For example, the I picture detector 15 detects the I picture in the video data accumulated in the buffer (12a or 12b) that supplies data to the wireless communication unit (13a or 13b) that performs transmission by the currently selected communication method. The I picture detector 15 temporarily reads the video data accumulated in the buffer (12a or 12b) to detect the I picture. In parallel this, reading of the video data from the transmission buffers 12a, 12b is performed by the wireless communication units 13a, 13b as described above.

The synchronization-data generator 16 generates time data indicating the head position (the head position of a GOP) of the I picture detected by the I picture detector 15, and supplies it to the wireless communication unit 13a and/or 13b as synchronization data Dsa and/or Dsb. This time data is data indicating a reproduction time (e.g., a reproduction time in which the head of video content is set as a reference point), which is generated by using a count value of system time that is called system time clock (STC) associated with the video signal. When the transmission is performed by the first communication method, the synchronization data Dsa is generated and supplied to the wireless communication unit 13a. When the transmission is performed by the second communication method, the synchronization data Dsb is generated and supplied to the wireless communication unit 13b. When the transmission is performed by the first communication method and the second communication method in parallel, the synchronization data Dsa and Dsb are generated and supplied to the wireless communication units 13a, 13b, respectively.

The wireless communication unit 13a associates the synchronization data Dsa sent from the synchronization-data generator 16 with the corresponding I picture, and transmits the synchronization data Dsa together with the video data Dva, that is, multiplexed with the video data Dva.

The wireless communication unit 13b associates the synchronization data Dsb sent from the synchronization-data generator 16 with the corresponding I picture, and transmits the synchronization data Dsb together with the video data Dvb, that is, multiplexed with the video data Dvb.

In Bluetooth and Wi-Fi, control data can be forwarded in addition to video and audio. That is, in the case of Bluetooth, control data can be transmitted by the protocol called Audio/Video Remote Control Profile (AVRCP). In the case of Wi-Fi, control data can be forwarded during IP transmission. Synchronization data can be transmitted by utilizing these.

The controller 18 is constituted of a CPU, for example.

The controller 18 performs a control for switching the communication method based on the switching-request signals Swa, Swb that are sent out from the reception device 20 and are supplied via the wireless communication units 13a, 13b. Specifically, the control of the distributor 11, the transmission buffers 12a, 12b, the wireless communication units 13a, 13b, the I picture detector 15, and the synchronization-data generator 16 for switching the communication method is performed.

Further, the controller 18 controls the distributor 11, the transmission buffers 12a, 12b, the wireless communication units 13a, 13b, the I picture detector 15, and the synchronization-data generator 16 to stop the transmission based on the transmission-stop signals Tsa, Tsb that are sent out from the reception device 20 and are supplied via the wireless communication units 13a, 13b, thereby causing the wireless communication unit (13a or 13b) that performs transmission with the method requested to stop the transmission to stop the data distribution to the buffer (12a or 12b) that supplies data, and causing the wireless communication unit (13a or 13b) that performs the transmission with the method requested to stop the transmission to stop the transmission process of the video data.

Control signal lines from the controller 18 to the respective units are not illustrated in Figures.

The reception device 20 illustrated in FIG. 3 normally selects one of the first and second communication methods and performs reception by the selected communication method, and performs reception by both of the first and second communication methods in parallel when the communication method is switched.

The reception device 20 illustrated in FIG. 3 includes first and second wireless communication units 21a, 21b, first and second reception buffers 22a, 22b, a data synchronization unit 24, a switch 25, a switching-timing-signal generator 26, and a controller 28.

The first wireless communication unit 21a wirelessly receives the data transmitted by the first communication method from the transmission device 10, and monitors a data receiving condition with the first communication method, and transmits information (receiving condition data) Rsa indicating the receiving condition to the controller 28. For example, the first wireless communication unit 21a measures an error rate of the received data, and informs the controller 28 of the measurement result. Further, the wireless communication unit 21a transmits the switching-request signal Swa and the transmission-stop signal Tsa to the transmission device 10 in response to an instruction from the controller 28.

The data received by the wireless communication unit 21a includes the synchronization data Dsa in addition to the video data Dva.

The first reception buffer 22a temporarily accumulates the data received by the first wireless communication unit 21a.

The second wireless communication unit 21b wirelessly receives the data transmitted by the second communication method from the transmission device 10, and monitors a data receiving condition with the second communication method, and transmits information (receiving condition data) Rsb indicating the receiving condition to the controller 28. For example, the first wireless communication unit 21b measures an error rate of the received data, and informs the controller 28 of the measurement result. Further, the wireless communication unit 21b transmits the switching-request signal Swb and the transmission-stop signal Tsb to the transmission device 10 in response to an instruction from the controller 28.

The data received by the wireless communication unit 21b includes the synchronization data Dsb in addition to the video data Dvb.

The second reception buffer 22b temporarily accumulates the data received by the second wireless communication unit 21b.

Normally, only one of a combination of the first wireless communication unit 21a and the first reception buffer 22a and a combination of the second wireless communication unit 21b and the second reception buffer 22b operates, and the other stops its operation. When the communication method is switched, both of the above two combinations temporarily operate at the same time.

The data synchronization unit 24 synchronizes reading of data from the two reception buffers 22a, 22b, when the communication method is switched. That is, the synchronization is performed so that the heads of mutually corresponding I pictures included in the video data Dva, Dvb read from the reception buffers 22a, 22b are coincident with each other. For the purpose of this synchronization, the data synchronization unit 24 reads the video data Dva, Dvb and the synchronization data Dsa, Dsb from the reception buffers 22a, 22b, and repeats a process for modifying (performing one or both of a process for delaying the earlier one of the time points and a process for advancing the later one of the time points) them with referring to the read synchronization data Dsa, Dsb, when there is a difference between time points of reading of I pictures (I pictures associated with the same synchronization data) corresponding to these so that the time points of reading of the corresponding I pictures come closer to each other gradually and ultimately are coincident.

Except when the communication method is switched, data reception is performed only by one communication method, and in this case the received data is output without the above synchronization.

The switch 25 selects video data designated by the controller 28 from the video data read from the reception buffers 22a and 22b and supplies it to a decoding unit, not illustrated.

If the time points at which the data synchronization unit 24 reads the corresponding I pictures of the video data from the first and second reception buffers 22a, 22b are coincident when the communication method is switched, the switching-timing-signal generator 26 detects this fact, and generates a switching-timing signal Tsw, and supplies it to the controller 28.

The controller 28 instructs the switch 25 to switch in response to the switching-timing signal Tsw, and accordingly the switch 25 performs switching.

The controller 28 judges whether or not the switching of the communication method is necessary on the basis of the measurement results Rsa, Rsb from the wireless communication units 21a, 21b (one of which performs reception). For example, when the controller 28 judges that the receiving condition becomes worse than a predetermined level on the basis of the measurement result, for example when the error rate becomes higher than a predetermined threshold value, the controller 28 judges that switching is necessary.

When the controller 28 judges that the switching of the communication method is necessary, the controller 28 generates the switching-request signals Swa, Swb, and instructs the wireless communication units 21a, 21b to transmit the switching-request signals Swa, Swb. The wireless communication units 21a, 21b transmit the switching-request signals Swa, Swb to the transmission device 10 in response to the instruction from the controller 28.

When the controller 28 judges that the switching of the communication method is necessary caused by deterioration of the receiving condition in the first wireless communication unit 21a in a state where the communication is performed by the first communication method, the controller 28 instructs the wireless communication unit 21a to transmit the switching-request signal Swa. The switching-request signal Swa transmitted from the wireless communication unit 21a requests switching to the second communication method.

When the controller 28 judges that the switching of the communication method is necessary caused by deterioration of the receiving condition in the second wireless communication unit 21b in a state where the communication is performed by the second communication method, the controller 28 instructs the wireless communication unit 21b to transmit the switching-request signal Swb. Thus, the switching-request signal Swb transmitted from the wireless communication unit 21b requests switching to the first communication method.

When the switching of the communication method is completed, the controller 28 generates the transmission-stop signals Tsa, Tsb and instructs the wireless communication units 21a, 21b to transmit the transmission-stop signals Tsa, Tsb. The wireless communication units 21a, 21b transmit the transmission-stop signals Tsa, Tsb to the transmission device 10 in response to the instruction from the controller 28.

The transmission-stop signal Tsa is generated when the switching from the first communication method to the second communication method is completed. The transmission-stop signal Tsb is generated when the switching from the second communication method to the first communication method is completed.

The transmission-stop signal Tsa requests a stop of the communication with the first communication method, and the transmission-stop signal Tsb requests a stop of the communication with the second communication method.

In the following, a switching of communication, particularly communication method, of video data by the transmission device 10 of FIG. 2 and the reception device 20 of FIG. 3 will be described.

First, transmission is assumed to be performed by the first communication method.

In the transmission device 10, the video data Dva distributed by the distributor 11 is temporarily accumulated in the first transmission buffer 12a, and is read and transmitted by the first wireless communication unit 13a.

In addition to this, the synchronization data Dsa generated by the synchronization-data generator 16 is sent from the first wireless communication unit 13a.

The data transmitted from the first wireless communication unit 13a is received by the first wireless communication unit 21a of the reception device 20, and is accumulated in the reception buffer 22a, and is output via the data synchronization unit 24 and the switch 25, and is supplied to the decoding unit, not illustrated.

The wireless communication unit 21a measures receiving condition and transmits the measurement result Rsa to the controller 28, while receiving data.

The controller 28 monitors the measurement result Rsa and instructs the wireless communication unit 21a to send the switching-request signal Swa to the transmission device 10 when the controller 28 judges the receiving condition is becomes worse than a predetermined level, for example, when the error rate becomes higher than a predetermined threshold value.

The wireless communication unit 21a transmits the switching-request signal Swa to the transmission device 10, in response to this instruction.

The wireless communication unit 13a of the transmission device 10 receives the switching-request signal Swa, and transmits it to the controller 18.

When the controller 18 receives the switching-request signal Swa, the controller 18 instructs the distributor 11 to start distributing video data to the transmission buffer 12b, and instructs the transmission buffer 12b to start accumulating the video data Dvb temporarily, and instructs the wireless communication unit 13b to start transmitting, and instructs the I picture detector 15 to start detecting the I picture in the video data Dvb accumulated in the transmission buffer 12b, and instructs the synchronization-data generator 16 to start generating the synchronization data Dsb for I picture in the video data Dvb accumulated in the transmission buffer 12b.

On the other hand, distribution of video data to the transmission buffer 12a by the distributor 11, operation (accumulation of the video data Dva, transmission of the video data Dva and the synchronization data Dsa, and reception of the switching-request signal Swa and the transmission-stop signal Tsa) of the transmission buffer 12a and the wireless communication unit 13a, detection of I picture in the video data Dva accumulated in the transmission buffer 12a by the I picture detector 15, and generation of the synchronization data Dsa by the synchronization-data generator 16 are continued.

When the video data Dvb equal to or larger than a predetermined amount is accumulated in the transmission buffer 12b, the second wireless communication unit 13b starts reading the video data Dvb from the transmission buffer 12b and starts transmitting by the second communication method.

Simultaneously, the I picture in the video data Dvb accumulated in the transmission buffer 12b is detected by the I picture detector 15, and the synchronization data Dsb is generated by the synchronization-data generator 16 based on the detection result, and the generated synchronization data Dsb is transmitted from the second wireless communication unit 13b.

Immediately after the start of transmission by the second communication method, transmission by the first communication method and transmission by the second communication method are performed in parallel, and both of detection of the I picture by the I picture detector 15 and generation of synchronization data by the synchronization-data generator 16 are performed in parallel for the two communication methods.

That is, when the I pictures in the data accumulated in the transmission buffers 12a, 12b are detected by the I picture detector 15 after transmission by the first communication method and transmission by the second communication method are started, this fact is transmitted to the synchronization-data generator 16, and the synchronization data Dsa, Dsb are output from the synchronization-data generator 16.

The synchronization data Dsa, Dsb are associated with the corresponding video data Dva, Dvb and multiplexed with the video data Dva, Dvb, and are sent by the respective communication methods from the first and second wireless communication units 13a, 13b.

The data received by the wireless communication units 21a, 21b in the reception device 20 are accumulated in the reception buffers 22a, 22b respectively, and thereafter read by the data synchronization unit 24.

In the first communication method and the second communication method, data arrival time are different, and thus time points of writing into the reception buffers 22a, 22b are different. This state is illustrated in FIGS. 4A and 4B. FIG. 4A illustrates time points of writing into the reception buffer 22a, and FIG. 4B illustrates time points of writing into the reception buffer 22b. As illustrated in the drawings, GOP head positions (writing time point) are different in the reception buffer 22a and the reception buffer 22b.

There is a possibility of occurring a time lag between the time points of data output to the data synchronization unit 24 from the reception buffers 22a, 22b as illustrated in FIGS. 4A, 4B for example, immediately after starting the transmission by the two methods. When there is the time lag between the time points, the data synchronization unit 24 reads data, and simultaneously adjusts the time points of reading little by little with reference to the synchronization data Dsa, Dsb so that the time points of reading from the two buffers come closer to each other gradually and ultimately the time points (the time points at which the same I picture is read) of reading from the two buffers are coincident. In this synchronization, the data synchronization unit 24 gets the time points of reading of I pictures corresponding to the synchronization data Dsa, Dsb closer to each other gradually, with reference to the synchronization data Dsa, Dsb associated with the video data Dva, Dvb.

A state with which the time points of reading are coincident is illustrated in FIGS. 4C and 4D. FIG. 4C illustrates time points of reading from the reception buffer 22a, and FIG. 4D illustrates time points of reading from the reception buffer 22b.

When the time points of reading of the video data Dva, Dvb from the reception buffers 22a, 22b are coincident, the switching-timing-signal generator 26 detects this fact and generates a switching-timing signal Tsw at a time point immediately before an I picture is read.

When the switching-timing signal Tsw is generated, the controller 28 instructs the switch 25 to switch, and in response to this, the switch 25 performs switching. Up to this, the switch 25 has selected the video data Dva from the reception buffer 22a from two outputs of the data synchronization unit 24, but after the switching, selects the video data Dvb from the reception buffer 22b.

The switching is performed based on the switching-timing signal Tsw, and accordingly is performed immediately before the I picture. Thus, the video data that comes out to the output side of the switch 25 has continuity, and disturbance is not generated in the video obtained by decoding this video data.

When the switching of the video data by the switch 25 is completed, the controller 28 instructs the wireless communication unit 21a that performs the reception by the first communication method to stop the reception. In addition to this, the controller 28 causes the wireless communication unit 21a to transmit the transmission-stop signal Tsa for requesting the stop of the communication by the first communication method.

This transmission-stop signal Tsa is received by the wireless communication unit 13a of the transmission device 10, and transmitted to the controller 18.

The controller 18 sends an instruction to the distributor 11 to stop distributing the video data to the first transmission buffer 12a, and sends instructions to the first transmission buffer 12a and the first wireless communication unit 13a to stop accumulating data in the first transmission buffer 12a and stop transmitting by the first wireless communication unit 13a. Further, the controller 18 sends a command to the I picture detector 15 to stop detecting the I picture in the data accumulated in the first transmission buffer 12a, and sends a command to the synchronization-data generator 16 to stop generating the synchronization data Dsa concerning the I picture in the data accumulated in the first transmission buffer 12a.

Thus, the switching from the first communication method to the second communication method is completed.

Also, a switching from the second communication method to the first communication method is performed in the same way.

As described above, in the first embodiment, since the switch is switched immediately before an I picture while the time points of reading of the I picture from the reception buffer of the reception device 20 is coincident, the video data that comes out to the output side of the switch 25 has continuity, and disturbance does not occur in the video based on the video data.

Second Embodiment

Figure 5:
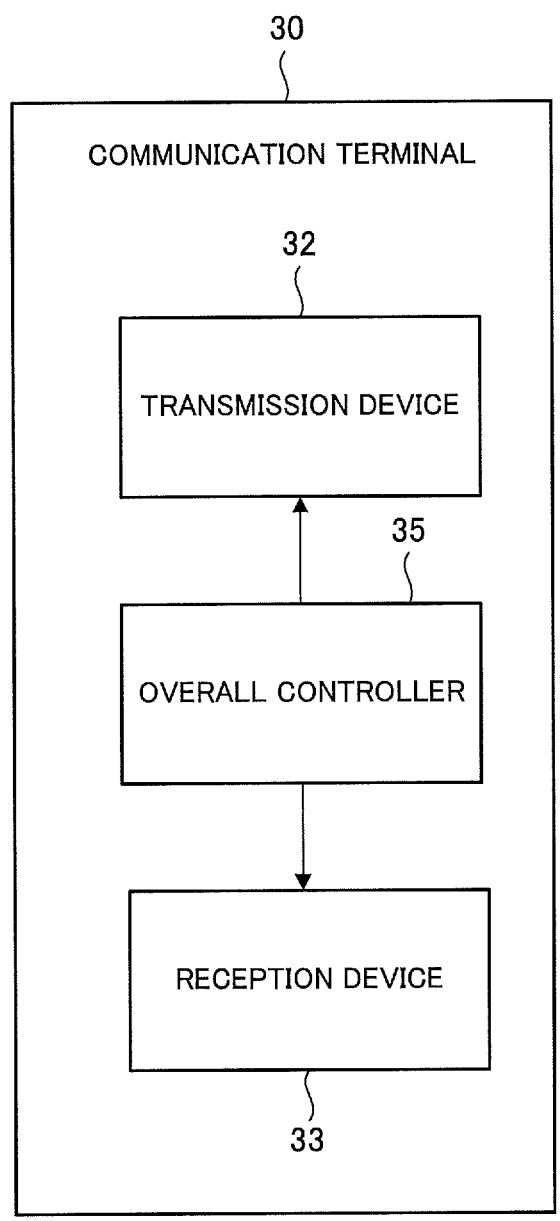
FIG. 5 is a block diagram illustrating a communication terminal according to a second embodiment of the present invention.

FIG. 5 is a block diagram illustrating a configuration example of a communication terminal used in a wireless communication system of the second embodiment of the present invention.

The illustrated communication terminal has both of the function of the transmission device 10 of FIG. 2 and the function of the reception device 20 of FIG. 3, and includes a transmission device 32 and a reception device 33. The transmission device 32 is configured in the same way as the transmission device 10 of FIG. 2, and the reception device 33 is configured in the same way as the reception device 20 of FIG. 3.

The communication terminal of FIG. 5 is capable of operating as the transmission device and operating as the reception device, and is controlled by an overall controller 35 whether to operate as which device.

Figure 6:
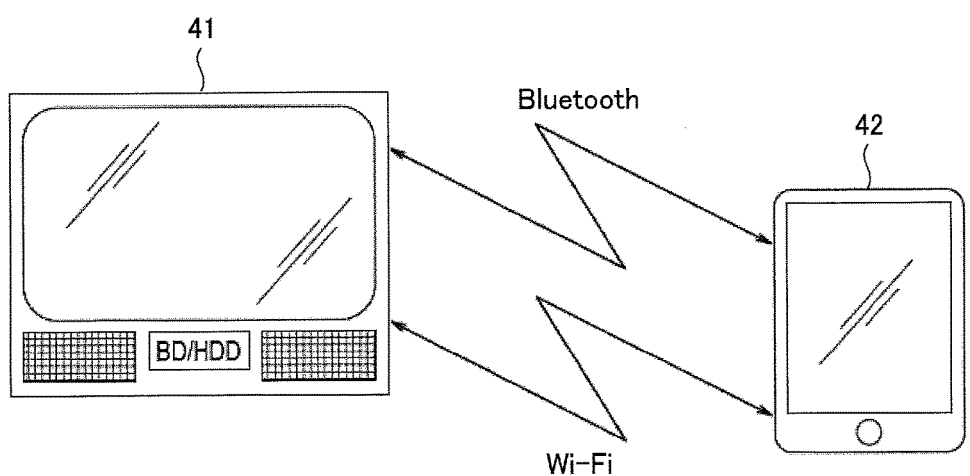
FIG. 6 is a schematic diagram illustrating an example of a wireless communication system including the communication terminal of FIG. 5.

It is possible to perform data transmission in both directions between two devices, by providing the communication terminal illustrated in FIG. 5 in each of the two devices. For example, as illustrated in FIG. 6, the communication terminal of FIG. 5 is provided in each of a television receiver 41 having a recording device such as a Blu-ray disk device and an HDD, and a tablet terminal 42, it is possible to view video content accumulated in the recording device of the television receiver 41 on the tablet terminal 42 and, on the other hand, to view video content accumulated in the tablet terminal 42 on the screen of the television receiver 41.

In this case as well, in the same way as described in the first embodiment, one of two communication methods, for example, such as Bluetooth method and Wi-Fi method, is selected to perform communication, and when the reception quality with the currently selected communication method deteriorates, the communication method can be switched to the other communication method, and furthermore discontinuity of video data is not generated at the time of switching, and disturbance of video can be prevented.

Third Embodiment

Figure 7:
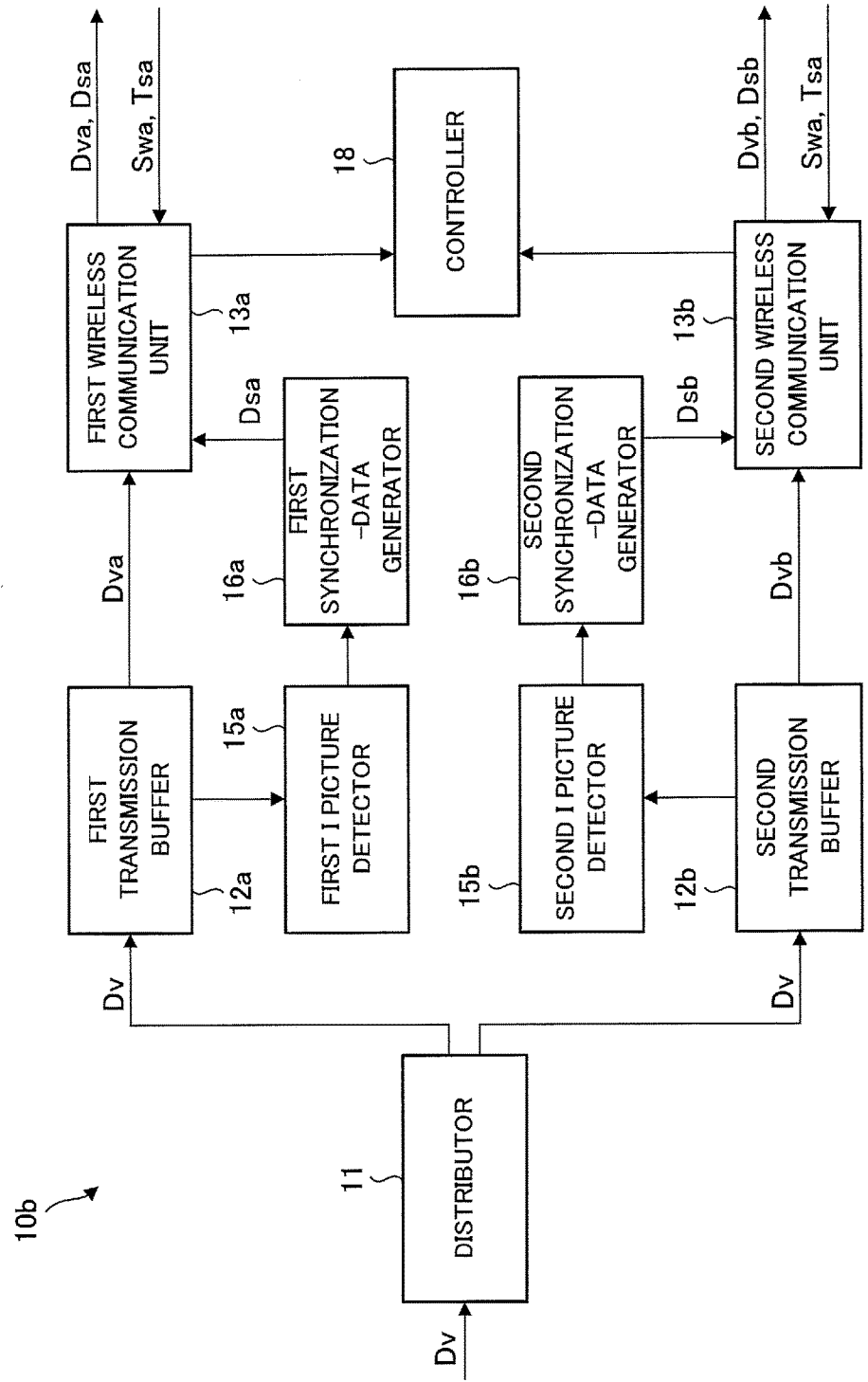
FIG. 7 is a block diagram illustrating a transmission device according to a third embodiment of the present invention.

FIG. 7 illustrates a transmission device 10b of the third embodiment.

The transmission device 10b of FIG. 7 can be used instead of the transmission device 10 of FIG. 2, and is substantially the same as the transmission device 10 of FIG. 2, but is different in that separate I picture detectors 15a, 15b and synchronization-data generators 16a, 16b are provided for the two communication methods, respectively.

Each of the I picture detectors 15a, 15b has the same function as the I picture detector 15 of FIG. 2. The I picture detector 15a detects I picture in the video data Dva accumulated in the transmission buffer 12a, and the I picture detector 15a detects the I picture in the video data Dvb accumulated in the transmission buffer 12a.

Each of the synchronization-data generators 16a, 16b has the same function as the synchronization-data generator 16 of FIG. 2. The synchronization-data generator 16a generates the synchronization data Dsa corresponding to the I picture detected by the I picture detector 15a, and the synchronization-data generator 16b generates the synchronization data Dsb corresponding to the I picture detected by the I picture detector 15b.

In order to detect the I pictures by the two communication methods with one I picture detector 15 and generate the synchronization data Dsa, Dsb for the data transmitted by the two communication methods with one synchronization-data generator 16 as in FIG. 2, each process needs to be performed in a time division manner, and thus processing is difficult when communication is performed at a high speed. In contrast, as illustrated in FIG. 7, by providing the separate I picture detectors 15a, 15b and synchronization-data generators 16a, 16b for the two communication methods, processing can be performed even when communication is performed at a high speed (i.e., even when writes and reads at the transmission buffers 12a, 12b and transmission at the wireless communication units 13a, 13b are performed at a high speed).

Fourth Embodiment

Communication is performed by selecting one of two communication methods in the first embodiment. However, the present invention is applicable to a case in which the number of selectable communication methods is three or more. Generally speaking, the present invention is applicable to a case in which communication is performed by selecting one of the first to N-th (N is an integer equal to or greater than 2) communication methods and to a case in which the selected communication method is switched to one of the other communication methods when the receiving condition with the selected communication method becomes worse.

When the number of selectable communication methods is N, the transmission device wirelessly transmits video data by the communication method selected from the first to N-th (N is an integer equal to or greater than 2) communication methods, and the reception device receives and decodes the video data transmitted by the transmission device.

When the receiving condition in the reception device becomes worse than a predetermined level in a state where the transmission device performs transmission by the i-th (i is one of 1 to N), the reception device requests switching to the j-th (j is one of 1 to N except i) communication method, and the transmission device continues the transmission by the i-th communication method and starts transmission by the j-th communication method in response to the switching request. After the reception device synchronizes the video data Dv-i transmitted by the i-th communication method and the video data Dv-j transmitted by the j-th communication method, switching from the video data Dv-i transmitted by the i-th communication method to the video data Dv-j transmitted by the j-th communication method is performed. After this switching, the reception device requests a stop of the transmission by the i-th communication method, and the transmission device stops the transmission by the i-th communication method in response to the stop request of the transmission.

A configuration example of the transmission device and a configuration example of the reception device, which operate as described above, are illustrated in FIGS. 8 and 9, respectively.

The transmission device 50 of FIG. 8 includes a distributor 51, first to N-th transmission buffers 12-1 to 12-N, first to N-th wireless communication units 13-1 to 13-N, an I picture detector 55, a synchronization-data generator 56, and a controller 58.

The distributor 51 distributes video data Dv.

The first to N-th transmission buffers 12-1 to 12-N temporarily accumulate the video data Dv distributed by the distributor 51 as video data DV-1 to Dv-N, respectively.

The first to N-th wireless communication units 13-1 to 13-N transmit the video data Dv-1 to Dv-N accumulated in the first to N-th transmission buffers 12-1 to 12-N by the first to N-th communication methods, respectively.

The I picture detector 55 detects the I picture included in the video data Dv-1 to Dv-N accumulated in the first to N-th transmission buffers 12-1 to 12-N.

The synchronization-data generator 56 generates synchronization data Ds-1 to Ds-N indicating reproduction time of the I picture detected by the I picture detector 55.

The wireless communication units 13-1 to 13-N associate the synchronization data Ds-1 to Ds-N sent from the synchronization-data generator 56 with the corresponding I pictures, and transmit the synchronization data Ds-1 to Ds-N together with the video data Dv-1 to Dv-N, that is, multiplexed with the video data.

The controller 58 performs a control for switching the communication method based on switching-request signals Sw-1 to Sw-N that are sent out from the reception device 60 and are supplied via the wireless communication units 13-1 to 13-N. Specifically, control of the distributor 51, the transmission buffers 12-1 to 12-N, the wireless communication units 13-1 to 13-N, the I picture detector 55, and the synchronization-data generator 56 is performed for switching.

Further, the controller 58 controls the distributor 51, the transmission buffers 12-1 to 12-N, the wireless communication units 13-1 to 13-N, the I picture detector 55, and the synchronization-data generator 56 to stop the transmission based on the transmission-stop signals Ts-1 to Ts-N that are sent out from the reception device 60 and are supplied via the wireless communication units 13-1 to 13-N, and stop data distribution to the buffer (one of 12-1 to 12-N) that supplies data to the wireless communication unit (one of 13-1 to 13-N) that performs transmission by the method to which the stop of transmission is requested, and stop the process for transmitting video data by the wireless communication unit (one of 13-1 to 13-N) that performs transmission by the method to which the stop of the transmission is requested.

Signal lines for control from the controller 58 to the respective units are not illustrated.

When the transmission device 50 performs transmission by the n-th (n is one of 1 to N) communication method, the distributor 51 supplies the video data Dv to the n-th transmission buffer 12-n, the I picture detector 55 detects the I picture included in the video data Dv-n accumulated in the n-th transmission buffer 12-n, and the synchronization-data generator 56 outputs synchronization data Ds-n indicating reproduction time of the I picture detected by the I picture detector 55, while the operation for transmission by a communication method except the n-th communication method is not performed.

When the transmission device 50 switches from the i-th (i is one of 1 to N) communication method to the j-th (j is one of 1 to N except i) communication method, the distributor 51 supplies the video data Dv to the i-th and j-th transmission buffers 12-$i$, 12-$j$, the I picture detector 55 detects I pictures included in the video data Dv-i, Dv-j accumulated in the i-th and j-th transmission buffers 12-$i$, 12-$j$, the synchronization-data generator 56 outputs the synchronization data Ds-i, Ds-j indicating reproduction time of the I pictures of the video data Dv-i, Dv-j detected by the I picture detector 55, and the i-th and j-th wireless communication units 13-$i$, 13-$j$ transmit the synchronization data Ds-i, Ds-j together with the video data Dv-Dv-j, respectively.

The reception device 60 illustrated in FIG. 9 includes first to N-th wireless communication units 21-1 to 21-N, first to N-th reception buffers 22-1 to 22-N, a data synchronization unit 64, a switch 65, a switching-timing-signal generator 66, and a controller 68.

The first to N-th wireless communication units 21-1 to 21-N receive data transmitted by the first to N-th communication methods (including the video data Dv-1 to Dv-N and the synchronization data Ds-1 to Ds-N, respectively) respectively, generate information Rs-1 to Rs-N indicating receiving condition, and transmit it to the controller 68. Further, the wireless communication units 21-1 to 21-N transmit switching-request signals Sw-1 to Sw-N and transmission-stop signals Ts-1 to Ts-N to the transmission device 50 in response to the instruction from the controller 58.

The first to N-th reception buffers 22-1 to 22-N temporarily accumulate the data received by the first to N-th wireless communication units 21-1 to 21-N, respectively.

Normally, only a combination of one of the first to N-th wireless communication units 21-1 to 21-N and the corresponding reception buffer operates, and the other wireless communication units and reception buffers stop its operation. When the communication method is switched, the wireless communication unit that performs reception by the communication method before the switching and the wireless communication unit that performs reception by the communication method that is to be selected after the switching and the reception buffers corresponding to these operate, and the other wireless communication units and reception buffers stop their operation.

When the communication method is switched, the data synchronization unit 64 synchronizes reading of the video data from two reception buffers (two of the first to N-th reception buffers 22-1 to 22-N, that is, the ones that accumulate the received data) that accumulate the data received by the two communication methods while data reception is performed in parallel by two communication methods of the communication method before the switching and the communication method that is to be selected after the switching. This synchronization method is the same as that described in the first embodiment.

When data reception is performed only by one communication method, the received data is output without being performed the above synchronization.

The switch 65 selects the video data designated by the controller 68 from the video data read from the first to N-th reception buffers 22-1 to 22-N, and supplies it to a decoding unit, not illustrated.

When the communication method is switched, if synchronization is achieved by the data synchronization unit 64 (if the time points of reading of the corresponding I pictures of the video data from the two reception buffers are coincident), the switching-timing-signal generator 66 detects that, and generates a switching-timing signal Tsw, and supplies it to the controller 68.

The controller 68 instructs the switch 65 to switch in response to the switching-timing signal Tsw, and accordingly the switch 65 performs switching.

The controller 68 judges whether or not the switching of the communication method is necessary based on the measurement results Rs-1 to Rs-N from the wireless communication units 21-1 to 21-N (one of which performs reception). For example, when judging that the receiving condition becomes worse than a predetermined level based on the measurement results, for example when the error rate becomes higher than a predetermined threshold value, the controller 68 judges that a switching is necessary.

When determining that a switching of the communication method is necessary, the controller 68 generates (one of) the switching-request signals Sw-1 to Sw-N and instructs one of the wireless communication units 21-1 to 21-N to transmit the switching-request signal Sw-1 to Sw-N. The wireless communication units 21-1 to 21-N transmit the switching-request signal Sw-1 to Sw-N to the transmission device 50 in response to the instruction from the controller 68.

For example, the controller 68 generates a signal Sw-i for requesting switching of the communication method, when the i-th wireless communication unit 21-$i$ outputs information Rs-i which indicates that the receiving condition becomes worse than a predetermined level in a state where the transmission is performed by the i-th (i is one of 1 to N) communication method. This signal Sw-i includes information indicating a communication method that is to be selected after the switching. In the following description, the communication method that is to be selected after the switching is assumed to be the j-th (j is one of 1 to N except i) communication method.

One of the communication methods except the i-th communication method (currently used communication method) is selected in accordance with a predetermined rule, for example.

For example, N communication methods may be selected cyclically and may be selected in the order of predetermined priority, and the communication method of the best receiving condition may be preferentially selected by accumulating data indicating measurement results of receiving condition with respect to each utilization of each communication method and by judging them comprehensively.

When the communication method is selected cyclically, the (m+1)-th communication method is selected if the receiving condition becomes worse in a state where the communication is performed by the m-th (m is one of 1 to (N−1)) communication method, and the first communication method is selected if the receiving condition becomes worse in a state where the communication is performed by the N-th communication method.

When the communication method is selected in the order of predetermined priority, the communication method of the highest priority is selected from the communication methods except the communication method of which receiving condition is worse.

When the switching-request signal Sw-i is sent out, the i-th wireless communication unit 21-$i$ transmits the signal Sw-i for requesting switching of the communication method to the transmission device 50.

After receiving the signal Sw-i for requesting switching to the j-th communication method from the reception device 60 in a state where the video data is transmitted by the i-th communication method, the controller 58 of the transmission device 50 instructs a start of transmission by the j-th communication method. In response to this instruction, the distributor 51 starts distributing video data to the j-th transmission buffer 12-$j$ (the buffer that temporarily accumulates the video data Dv-j transmitted by the wireless communication unit 13-$j$ that performs communication by the j-th communication method), and the j-th wireless communication unit 13-$j$ starts transmitting the video data accumulated in the j-th transmission buffer 12-$j$. As a result, the transmission of the video data Dv-i by the i-th wireless communication unit 13-$i$ and the transmission of the video data Dv-j by the j-th wireless communication unit 13-$j$ are performed in parallel.

The data synchronization unit 64 of the reception device 60 synchronizes reading of the video data Dv-i, Dv-j accumulated in the i-th reception buffer 22-$i$ and the j-th reception buffer 22-$j$, when the video data Dv-i, Dv-j are transmitted by both of the i-th communication method and the j-th communication method.

The switching-timing-signal generator 66 generates the switching-timing signal Tsw when the time point of reading of the I picture included in the video data Dv-i from the i-th reception buffer 22-$i$ and the time point of reading of the I picture included in the video data Dv-j from the j-th reception buffer 22-$j$ are coincident by synchronizing in the data synchronization unit 64.

When the switching-timing signal Tsw is generated, the controller 68 instructs the switch 65 to switch.

The switch 65 performs switching from the video data Dv-i transmitted by the i-th communication method to the video data Dv-j transmitted by the j-th communication method in response to the instruction from the controller 68.

Further, when the switching-timing signal Tsw is generated, the controller 68 generates a signal Ts-i for requesting a stop of transmission of video data by the i-th communication method, and the i-th wireless communication unit 21-$i$ transmits the signal Ts-i for requesting the stop of the transmission to the transmission device 50.

When the transmission device 50 receives the signal Ts-i for requesting the stop of the transmission from the reception device 60, the controller 58 of the transmission device 50 gives an instruction for stopping the operation for the transmission by the i-th communication method, to the distributor 51, the i-th transmission buffer 12-$i$, the i-th wireless communication unit 13-$i$, the I picture detector 55, and the synchronization-data generator 56.

In response to the instruction from the controller 58, the distributor 51 stops the supplying video data to the i-th transmission buffer 12-$i$ (the buffer that temporarily accumulates the video data transmitted by the wireless communication unit 13-$i$ that performs communication by the i-th communication method), and the i-th transmission buffer 12-$i$ stops the temporary accumulation of the video data, and the wireless communication unit 13-$i$ stops the transmission by the i-th communication method.

Further, the I picture detector 55 stops detecting the I picture in the video data Dv-i accumulated in the i-th transmission buffer 12-$i$, and the synchronization-data generator 56 stops generating the synchronization data Ds-i indicating reproduction time of the I picture in the video data Dv-i.

Accordingly, the switching is completed.

Although, in the above example, the switching-request signal and the transmission-stop signal are transmitted from the i-th wireless communication unit 21-$i$ of the reception device 60 to the i-th wireless communication unit 13-$i$ of the transmission device 50 in the case of the switching from the i-th communication method to the j-th communication method, the switching-request signal and the transmission-stop signal may be transmitted by using another wireless communication unit of the reception device 60 and another wireless communication unit of the transmission device 50. For example, the switching-request signal and the transmission-stop signal may be transmitted by using the j-th wireless communication unit 21-$j$ of the reception device 60 and the j-th wireless communication unit 13-$j$ of the transmission device 50 (i.e., the wireless communication unit 21-$j$ and the wireless communication unit 13-$j$ which perform communication by the communication method that is to be selected after the switching).

In the fourth embodiment as well, the number of I picture detectors and the number of synchronization-data generators may be each equal to the number of communication methods, as described in the third embodiment.

In that case, the I picture detector 55 including the first to N-th I picture detectors that detect the I picture included in the video data accumulated in the first to N-th buffers respectively is used, and the synchronization-data generator 56 including the first to N-th synchronization-data generators that generate the first to N-th synchronization data indicating the reproduction time of the I picture detected by the first to N-th I picture detectors respectively is used.

The description relevant to the fourth embodiment is applicable to any case when N is two or more. However, when N is 2, the switching-request signal may not include information indicating a communication method that is to be selected next.

As described above, when the number of selectable communication methods is N, it is possible to avoid occurring of discontinuity of video data when the communication method is switched, and it is possible to prevent occurring a problem such as video disturbance, in the same way as the first embodiment.

REFERENCE SIGNS LIST 11, 51 distributor, 12$a$, 12-1 first transmission buffer, 12$b$, 12-2 second transmission buffer, 12-N N-th transmission buffer, 13$a$, 13-1 first wireless communication unit, 13$b$, 13-2 second wireless communication unit, 13-N N-th wireless communication unit, 15, 55 I picture detector, 15$a$ first I picture detector, 15$b$ second I picture detector, 16, 56 synchronization-data generator, 16$a$ first synchronization-data generator, 16$b$ second synchronization-data generator, 18, 58 controller, 21$a$, 21-1 first wireless communication unit, 21$b$, 21-2 second wireless communication unit, 21-N N-th wireless communication unit, 22$a$, 22-1 first reception buffer, 22$b$, 22-2 second reception buffer, 22-N N-th reception buffer, 24, 64 data synchronization unit, 25, 65 switch, 26, 66 switching-timing-signal generator, 28, 68 controller, 35 overall controller.

The invention claimed is:

1. A wireless communication system comprising:
a transmission device configured to wirelessly transmit video data by a communication method selected from a plurality of communication methods; and
a reception device configured to receive and decode the video data transmitted by the transmission device, wherein:
when receiving condition in the reception device becomes worse than a predetermined level in a state where the transmission device performs transmission by one communication method of the plurality of communication methods, the reception device requests switching to another communication method than the one communication method of the plurality of the communication method, the transmission device continues the transmission by the one communication method and starts transmission by the another communication method, in response to the request of the switching, the reception device synchronizes the video data transmitted by the one communication method and the video data transmitted by the another communication method, and then performs switching from the video data transmitted by the one communication method to the video data transmitted by the another communication method, after the switching, the reception device requests a stop of the transmission by the one communication method, and the transmission device stops the transmission by the one communication method in response to the request of stop of the transmission, wherein:

the transmission device includes:

a plurality of transmission buffers;

a distributor configured to distribute the video data to the plurality of transmission buffers;

a plurality of wireless transmission units;

an I picture detector configured to detect an I picture of video included in the video data accumulated in the plurality of transmission buffers;

a synchronization-data generator configured to generate synchronization data; and a controller configured to control the plurality of wireless transmission units, wherein:

in order to perform transmission by the plurality of communication methods, the distributor distributes the video data transmitted by the plurality of communication methods to plurality of the transmission buffer, the I picture detector detects the I picture of video included in the video data accumulated in the plurality of transmission buffer, the synchronization-data generator outputs the synchronization data indicating reproduction time of I picture of video detected by the I picture detector configured to detect the I picture of the video, and where the selected communication device transmits the synchronization data together with the video data, and wherein the reception device includes:

a plurality of wireless reception units configured to receive the video data transmitted by the plurality of communication methods respectively and outputs information indicating receiving condition;

a plurality of reception buffers configured to temporarily accumulate the video data received by the plurality of wireless reception unit, respectively; and a controller configured to generate a signal for requesting switching to the another communication method, when the receiving condition in one wireless reception unit of the plurality of wireless reception units becomes worse than a predetermined level in the state where transmission is performed by the one communication methods of the plurality of communication methods, wherein:

at least any one of the plurality of wireless reception units transmits the signal for requesting switching of the communication method to the transmission device, after receiving the signal for requesting the switching of the communication method from the reception device in the state where transmission of video data is performed by the one communication method of the plurality of communication methods, the distributor starts distributing video data to one transmission buffer of the plurality of transmission buffer by the another communication method, so that transmission of video data by the plurality of wireless transmission units are performed in parallel, wherein:

the reception device further includes:

a data synchronizer configured to read and synchronize the video data accumulated in the plurality of reception buffer, while the video data is transmitted by the plurality of communication method;

a switching-timing-signal generator configured to generate a switching-timing signal, when time points of reading of the I pictures included in the video data from the plurality of reception buffer are coincident by synchronizing in the data synchronization unit; and a switch configured to switch from the video data transmitted by the one communication method of the plurality of the communication methods to the video data transmitted by the another communication method, when the switching-timing signal is generated, wherein:

the controller generates a signal for requesting the stop of the transmission of the video data by the one communication method, when the switching-timing signal is generated, at least any one of the plurality of wireless reception units transmit the signal for requesting the stop of the transmission to the transmission device, and after receiving the signal for requesting the stop of the transmission by the one communication method of the plurality of communication method from the reception device, the distributor stops distributing the video data to the transmission buffer except the one transmission buffer of the plurality of transmission buffers.

2. The wireless communication system according to claim 1, wherein:

the transmission device includes:

the distributor configured to distribute the video data;

first to N-th transmission buffers of the plurality of transmission buffers configured to temporarily accumulate the video data distributed by the distributor, N being an integer equal to or greater than 2;

first to N-th wireless transmission units of the plurality of wireless transmission units configured to transmit the video data accumulated in the first to N-th transmission buffers by first to N-th communication methods of the plurality of communication methods, respectively;

the I picture detector configured to detect an I picture included in the video data accumulated in the first to N-th transmission buffers;

the synchronization-data generator configured to generate synchronization data indicating reproduction time of the I picture detected by the I picture detector; and the controller configured to control the distributor and the first to N-th wireless transmission units, wherein:

when the transmission device performs transmission by an n-th communication method of the first to N-th communication methods, where n is one of 1 to N, the distributor distributes the video data to the n-th transmission buffer of the first to N-th transmission buffers, and the I picture detector detects the I picture included in the video data accumulated in the n-th transmission buffer, and the synchronization-data generator outputs the synchronization data indicating the reproduction time of the I picture detected by the I picture detector, and the n-th wireless transmission unit of the first to N-th wireless transmission units transmits the synchronization data together with the video data, and the reception device includes:

first to N-th wireless reception units of the plurality of wireless reception units configured to receive the video data transmitted by the first to N-th communication methods respectively and output information indicating receiving condition;

first to N-th reception buffers of the plurality of reception buffers configured to temporarily accumulate the video data received by the first to N-th wireless reception units, respectively; and the controller configured to generate a signal for requesting switching to a j-th communication method, j being one of 1 to N except i, when the receiving condition in an i-th wireless reception unit of the first to N-th wireless reception units becomes worse than a predetermined level in a state where transmission is performed by the i-th communication method of the first to N-th communication methods, where i is one of 1 to N, wherein:

at least one of the i-th wireless reception unit and a j-th wireless reception unit transmits the signal for requesting the switching of the communication method to the transmission device, and after receiving the signal for requesting the switching of the communication method from the reception device in the state where transmission of video data is performed by the i-th communication method, the distributor starts distributing video data to a j-th transmission buffer of the first to N-th transmission buffers, so that transmission of video data by the i-th wireless transmission unit of the first to N-th transmission units and transmission of video data by a j-th wireless transmission unit of the first to N-th transmission units are performed in parallel, wherein:

the reception device further includes:

the data synchronizer configured to read and synchronize the video data accumulated in the i-th reception buffer of the first to N-th reception buffers and a j-th reception buffer of the first to N-th reception buffers, while the video data are transmitted by both of the i-th communication method and a j-th communication method;

the switching-timing-signal generator configured to generate a switching-timing signal, when a time point of reading of the I picture included in the video data from the i-th reception buffer and a time point of reading of the I picture included in the video data from the j-th reception buffer are coincident by synchronizing in the data synchronizer; and the switch configured to switch from the video data transmitted by the i-th communication method to the video data transmitted by the j-th communication method, when the switching-timing signal is generated, wherein:

the controller generates a signal for requesting the stop of transmission by one of the communication method of the i-th and j-th communication methods, when the switching-timing signal is generated, at least one of the i-th wireless reception unit and the j-th wireless reception unit transmits the signal for requesting the stop of the transmission to the transmission device, and after receiving the signal for requesting the stop of the transmission by the i-th communication method from the reception device, the distributor stops distributing video data to the i-th transmission buffer of the first to N-th transmission buffers.

3. The wireless communication system according to claim 2, wherein:

the I picture detector includes first to N-th I picture detectors configured to detect an I picture included in video data accumulated in the first to N-th transmission buffers, respectively, and the synchronization-data generator includes first to N-th synchronization-data generators configured to generate first to N-th synchronization data indicating reproduction time of the I picture detected by the first to N-th I picture detectors, respectively.

4. A transmission device for wirelessly transmitting video data by a communication method selected from first to N-th communication methods, N being an integer equal to or greater than 2, the transmission device comprising:

a distributor configured to distribute the video data;

first to N-th transmission buffers configured to temporarily accumulate the video data distributed by the distributor;

first to N-th wireless transmission units configured to transmit the video data accumulated in the first to N-th transmission buffers by the first to N-th communication methods, respectively;

an I picture detector configured to detect an I picture included in the video data accumulated in the first to N-th transmission buffers;

a synchronization-data generator configured to generate synchronization data indicating reproduction time of the I picture detected by the I picture detector; and a controller configured to control the distributor and the first to N-th wireless transmission units, wherein:

when transmission is performed by an n-th communication method of the first to N-th communication methods, where n is one of 1 to N, the distributor distributes the video data to an n-th transmission buffer of the first to N-th transmission buffers, and the I picture detector detects the I picture included in the video data accumulated in the n-th transmission buffer, and the synchronization-data generator outputs the synchronization data indicating the reproduction time of the I picture detected by the I picture detector, and an n-th wireless transmission unit of the first to N-th transmission units transmits the synchronization data together with the video data, after receiving a signal for requesting switching of the communication method in a state where transmission of video data is performed by an i-th communication method of the first to N-th communication methods, where i is one of 1 to N, the distributor starts distribution of video data to a j-th transmission buffer of the first to N-th transmission buffers, where j is one of 1 to N except i, so that transmission of video data by the i-th wireless transmission unit of the first to N-th transmission units and transmission of video data by a j-th wireless transmission unit of the first to N-th transmission units are performed in parallel, and after receiving a signal for requesting a stop of the transmission by the i-th communication method, the distributor stops distributing video data to an i-th transmission buffer of the first to N-th transmission buffers.

5. The transmission device according to claim 4, wherein:
the I picture detector includes first to N-th I picture detectors configured to detect an I picture included in video data accumulated in the first to N-th transmission buffers, respectively, and
the synchronization-data generator includes first to N-th synchronization-data generators configured to generate first to N-th synchronization data indicating reproduction time of the I picture detected by the first to N-th I picture detectors, respectively.

6. A reception device for receiving video data that is wirelessly transmitted by first to N-th communication methods, where N is an integer equal to or greater than 2, the reception device comprising:
first to N-th wireless reception units configured to receive the video data transmitted by the first to N-th communication methods respectively and output information indicating receiving condition;
first to N-th reception buffers configured to temporarily accumulate the video data received by the first to N-th wireless reception units, respectively;
a controller configured to generate a signal for requesting switching to a j-th communication method of the first to N-th communication methods, j being one of 1 to N except i, when the receiving condition in an i-th wireless reception unit of the first to N-th wireless reception units becomes worse than a predetermined level in the state where transmission is performed by the i-th communication method of the first to N-th communication methods, where i is one of 1 to N;
a data synchronizer configured to read and synchronize the video data accumulated in an i-th reception buffer of the first to N-th reception buffers and a j-th reception buffer of the first to N-th reception buffers, while the video data are transmitted by both of the i-th communication method and the j-th communication method of the first to N-th communication methods;
a switching-timing-signal generator configured to generate a switching-timing signal, when a time point of reading of an I picture included in the video data from the i-th reception buffer and a time point of reading of an I picture included in the video data from the j-th reception buffer are coincident by synchronizing in the data synchronizer; and
a switch configured to switch from the video data transmitted by the i-th communication method to the video data transmitted by the j-th communication method, when the switching-timing signal is generated, wherein:
the controller generates a signal for requesting a stop of the transmission of the video data by the first communication method, when the switching-timing signal is generated, and
at least one of an i-th wireless reception unit of the first to N-th wireless reception units and a j-th wireless reception unit of the first to N-th wireless reception units transmits the signal for requesting the switching of the communication method and the signal for requesting the stop of the transmission.

7. A communication terminal comprising:
a transmission device according to claim 4; and
a reception device for receiving video data that is wirelessly transmitted by first to N-th communication methods, where N is an integer equal to or greater than 2, the reception device including:
first to N-th wireless reception units configured to receive the video data transmitted by the first to N-th communication methods respectively and output information indicating receiving condition;
first to N-th reception buffers configured to temporarily accumulate the video data received by the first to N-th wireless reception units, respectively;
a controller configured to generate a signal for requesting switching to a j-th communication method of the first to N-th communication methods, j being one of 1 to N except i, when the receiving condition in an i-th wireless reception unit of the first to N-th wireless reception units becomes worse than a predetermined level in the state where transmission is performed by the i-th communication method of the first to N-th communication methods, where i is one of 1 to N;
a data synchronizer configured to read and synchronize the video data accumulated in an i-th reception buffer of the first to N-th reception buffers and a j-th reception buffer of the first to N-th reception buffers, while the video data are transmitted by both of the i-th communication method and the j-th communication method of the first to N-th communication methods;
a switching-timing-signal generator configured to generate a switching-timing signal, when a time point of reading of an I picture included in the video data from the i-th reception buffer and a time point of reading of an I picture included in the video data from the j-th reception buffer are coincident by synchronizing in the data synchronizer; and
a switch configured to switch from the video data transmitted by the i-th communication method to the video data transmitted by the j-th communication method, when the switching-timing signal is generated, wherein:
the controller generates a signal for requesting a stop of the transmission of the video data by the first communication method, when the switching-timing signal is generated, and
at least one of an i-th wireless reception unit of the first to N-th wireless reception units and a j-th wireless reception unit of the first to N-th wireless reception units transmits the signal for requesting the switching of the communication method and the signal for requesting the stop of the transmission.

8. A communication terminal comprising:
a transmission device according to claim 5; and
a reception device for receiving video data that is wirelessly transmitted by first to N-th communication methods, where N is an integer equal to or greater than 2, the reception device including:
first to N-th wireless reception units configured to receive the video data transmitted by the first to N-th communication methods respectively and output information indicating receiving condition;
first to N-th reception buffers configured to temporarily accumulate the video data received by the first to N-th wireless reception units, respectively;
a controller configured to generate a signal for requesting switching to a j-th communication method of the first to N-th communication methods, j being one of 1 to N except i, when the receiving condition in an i-th wireless reception unit of the first to N-th wireless reception units becomes worse than a predetermined level in the state where transmission is performed by an i-th communication method of the first to N-th communication methods, where i is one of 1 to N;
a data synchronizer configured to read and synchronize the video data accumulated in an i-th reception buffer of the first to N-th reception buffers and a j-th reception buffer of the first to N-th reception buffers, while the video data are transmitted by both of the i-th communication method and the j-th communication method of the first to N-th communication methods;

a switching-timing-signal generator configured to generate a switching-timing signal, when a time point of reading of an I picture included in the video data from the i-th reception buffer and a time point of reading of an I picture included in the video data from the j-th reception buffer are coincident by synchronizing in the data synchronizer; and a switch configured to switch from the video data transmitted by the i-th communication method to the video data transmitted by the j-th communication method, when the switching-timing signal is generated, wherein:

the controller generates a signal for requesting a stop of the transmission of the video data by the first communication method, when the switching-timing signal is generated, and at least one of an i-th wireless reception unit of the first to N-th wireless reception units and a j-th wireless reception unit of the first to N-th wireless reception units transmits the signal for requesting the switching of the communication method and the signal for requesting the stop of the transmission.

* * * * *